(No Model.) 3 Sheets—Sheet 2.

G. W. YOUNG.
COTTON PICKER.

No. 545,117. Patented Aug. 27, 1895.

Witnesses
N. E. Oliphant
Jno. U. Leumberger

Inventor
Geo. W. Young.

(No Model.)

G. W. YOUNG.
COTTON PICKER.

No. 545,117. Patented Aug. 27, 1895.

Witnesses
N. E. Oliphant
Jno. W. Sternberger

Inventor
Geo. W. Young.

United States Patent Office.

GEORGE W. YOUNG, OF MILWAUKEE, WISCONSIN, ASSIGNOR OF TWO-THIRDS TO JOSEPH FLANNER AND HUGO LOEWENBACH, OF SAME PLACE.

COTTON-PICKER.

SPECIFICATION forming part of Letters Patent No. 545,117, dated August 27, 1895.

Application filed November 16, 1894. Serial No. 529,025. (No model.)

*To all whom it may concern:*

Be it known that I, GEORGE W. YOUNG, of Milwaukee, in the county of Milwaukee, and in the State of Wisconsin, have invented certain new and useful Improvements in Cotton-Pickers; and I do hereby declare that the following is a full, clear, and exact description thereof.

My invention has for its object to provide a cotton-picker which by suction or a blast of air cotton may be removed from the plant without injury to either the plant or cotton.

My invention therefore consists in certain peculiarities of construction and combination of parts, to be hereinafter described with reference to the accompanying drawings, and subsequently claimed.

Figure 1:
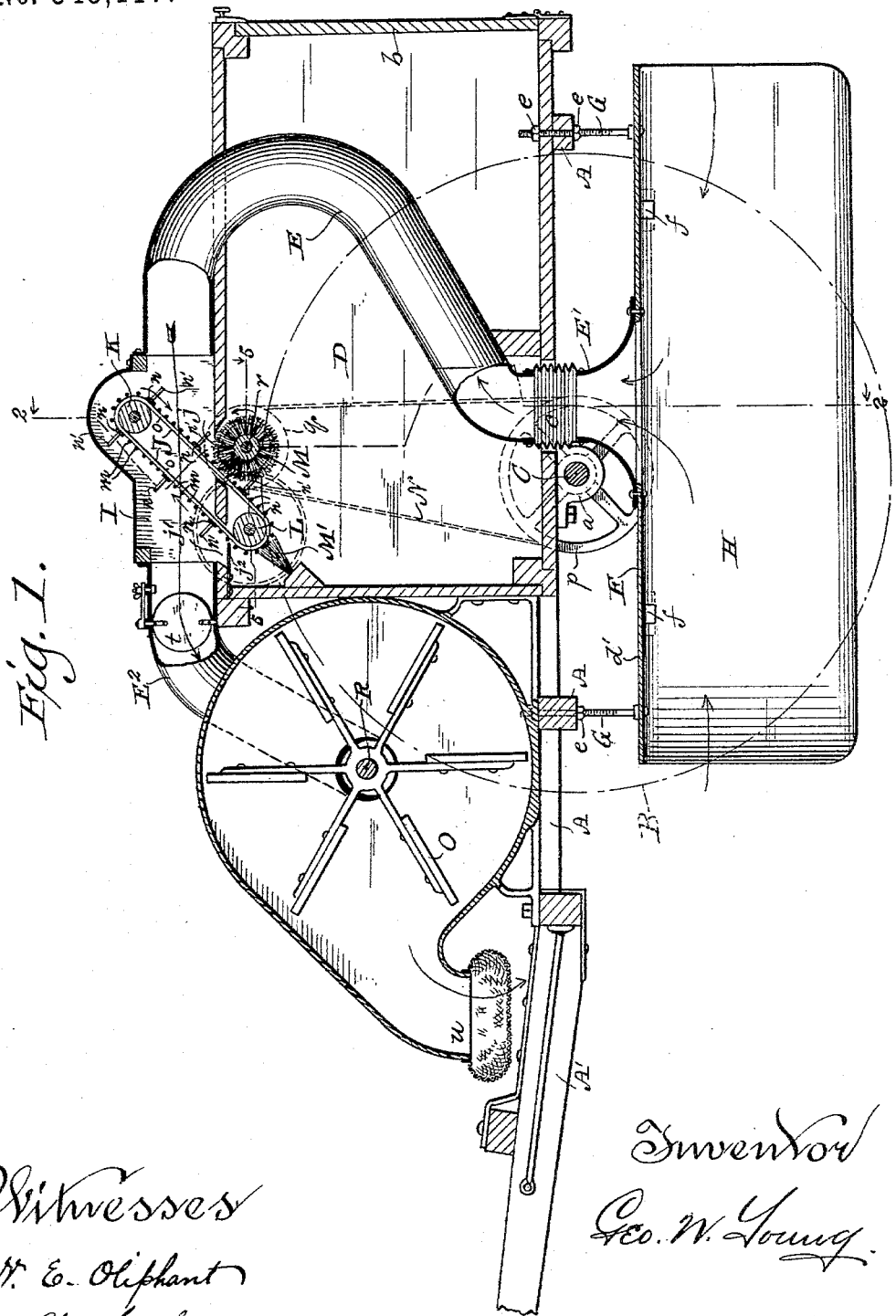
Figure 2:
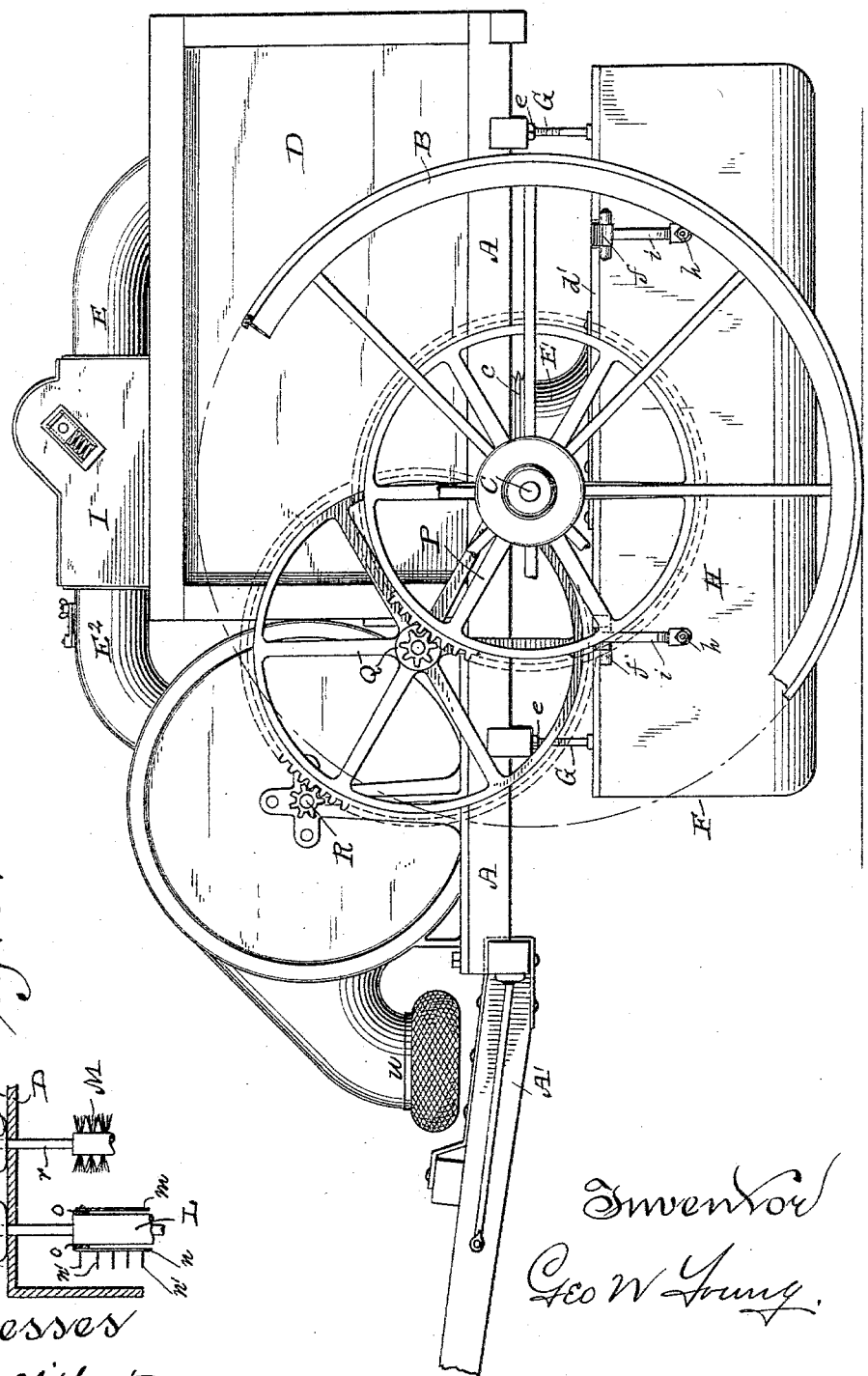
Figure 5:
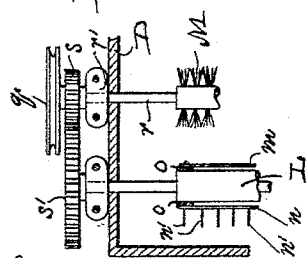
Figure 3:
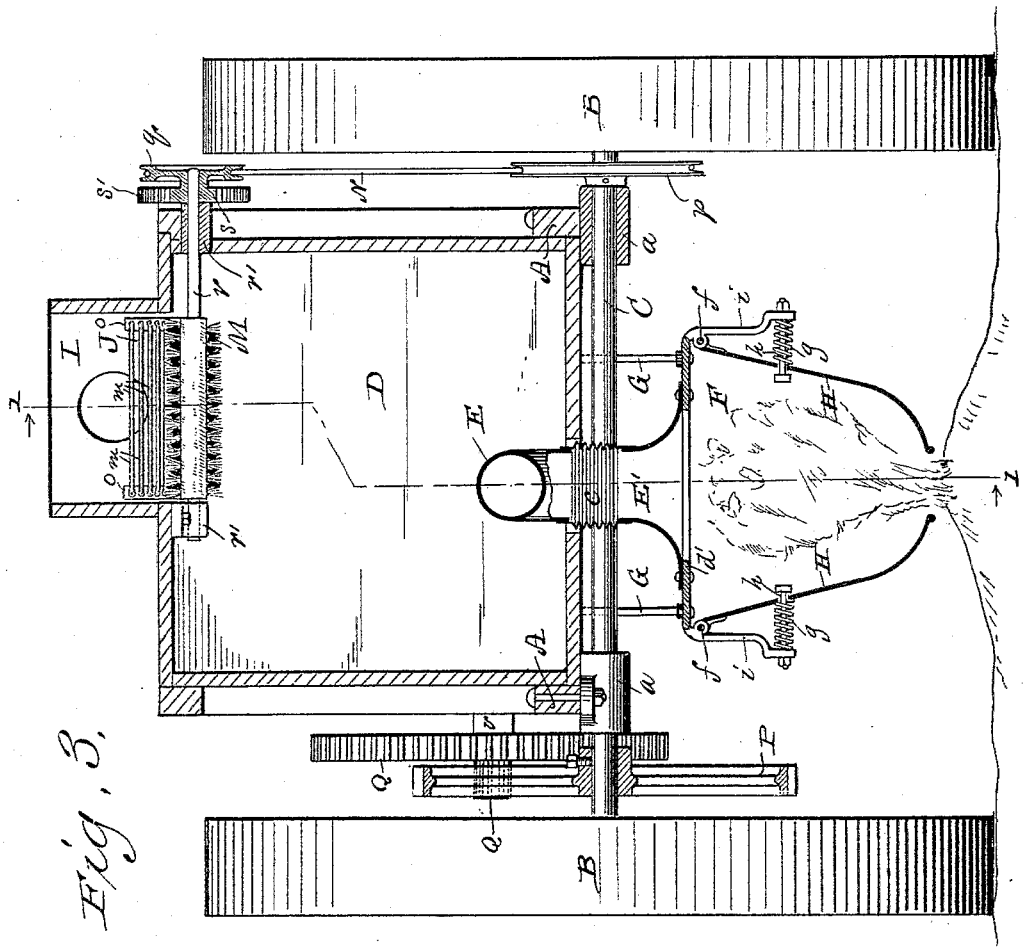
Figure 4:
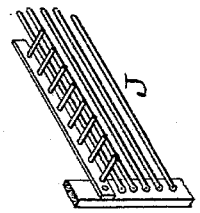

In the drawings, Figure 1 represents a vertical section of my machine on line 1 1 of Fig. 3. Fig. 2 is a side elevation of the same with a portion of the truck-wheel broken away. Fig. 3 is a section on line 2 2 of Fig. 1, looking from the rear. Fig. 4 is a perspective view of a portion of the belt. Fig. 5 is a detail section view on line 5 5 of Fig. 1, showing the belt-driving gear, &c.

Referring by letter to the drawings, A represents a suitable truck-frame, which is provided with tongue A'.

B are the wheels fastened on an axle C, that turns loosely in bearings $a$, bolted to the truck-frame.

Mounted upon the frame and midway between the wheels is a closed cotton-receptacle D, having a door $b$ at the rear through which the cotton is unloaded, and centrally located in the bottom of the receptacle is an opening through which a suction-pipe E, projects, having a flexible connection $c$ with a short section of pipe E', that flares at its lower end and is riveted to an inverted trough F, the bottom $d'$ of which has an opening corresponding to the pipe E'. The trough F, through which the plants pass when the machine is put in motion, is open at its ends and suspended from the truck-frame by means of bolts G and nuts $e$, thereby accomplishing a vertical adjustment of the trough with relation to the plants, there being sufficient elasticity in the connection $c$ to compensate all motion. The sides H H are hinged at $f$ to the bottom and are pressed inward by spiral springs $g$, which encircle bolts $h$, that pass through the sides H H and downwardly-projecting brackets $i$, said bolts thereby limiting the inward movement of the sides. The suction-pipe E passes up through the receptacle in the form of a "gooseneck" and enters a box I, which is provided with an endless belt J, that travels over an idle-roller K, that has its bearings in the box I, and down through a slot $j$ in the bottom of the box to a drive-roller L, located in the receptacle and having its bearings therein, and then up through another slot $j'$, which is normally closed by a flexible strip $j^2$, thereby cutting off as near as possible any current of air from the receptacle D. The belt J is preferably set at an acute angle to the air-current passing through the box I, so as to more readily gather and discharge the cotton that is deflected upon it, and is made up of cross-bars $m$ to form a close screen and at intervals flat strips $n$, both being riveted to leather strips $o$, that travel over the rollers K L. The strips $n$ have outwardly-projecting fingers $n'$, that form a comb and assist in carrying the cotton to the discharge-slot $j$, where it is cleaned from the belt by a rotary brush M and is dropped into the receptacle D, the brush being located at a point where the belt enters the cotton-receptacle and serves to close the discharge-slot and is driven in the same direction as the belt J by means of a belt N and pulley $p$ $q$, the former being fastened on the truck-axle and the latter on brush-spindle $r$, that turns in bearings $r'$ and carries a small pinion $s$, that meshes with a larger pinion $s'$, fastened on the spindle of driving-roller L. (Best illustrated in Fig. 5 of the drawings.)

Diametrically opposite the entrance of pipe E in box I is another pipe E², which has pivoted therein a regulating-damper $t$ and leads to a fan O, the casing of which is securely bolted to the truck-frame and has a discharge-opening $u$, covered by a wire netting. The fan is driven by a gear P, fastened on the truck-axle and in mesh with a nest-gear Q, loosely carried on a stud $v$, which in turn drives a pinion fastened on the fan-shaft R.

The operation of my machine is as follows: The trough being adjusted to the required height for the plants to pass freely through, the machine is drawn up the row of plants to be operated upon, the truck-wheels straddle the same and impart motion to the fan-gear, thereby creating a suction at the mouth of the pipe E', which causes the main current of air to enter the ends of the trough and pass through the plants, (the sides of said trough being held by the springs close in to the stalk of the plant near the ground,) lifting the ripe cotton from the bulb and delivering it by means of pipe E to the box I, where it is intercepted by the belt, the air passing through the same, and is discharged at the opening $u$ in the fan-casing, while the cotton is carried down by the belt into the receptacle, where it is taken by the brush and dropped therein. As shown in the drawings, I may use a stationary brush M' also.

Having thus fully described my invention, what I claim as new, and desire to secure by Letters Patent, is—

1. A cotton picker, comprising a rotary fan mounted upon a suitable truck, a pipe connected to said fan terminating adjacent to the plant to be operated upon, a traveling screen belt interposed between said fan and pipe terminus, and a delivery receptacle at the discharge end of said screen belt, substantially as set forth.

2. A cotton picker, comprising a rotary fan mounted upon a traveling carriage, a traction driving gear for the fan, a suction pipe connected to the fan and terminating adjacent to the plant to be operated upon, a traveling screen belt interposed between the fan and said pipe, a casing for the belt provided with an inlet and outlet opening for the suction pipe, a discharge opening between the inlet opening and said belt, a cleaner for the belt, and a receptacle adjacent to the discharge opening, substantially as set forth.

3. A cotton picker, comprising a rotary suction fan mounted upon a traveling carriage, a pipe leading from the fan and opening into a box, a screen belt traveling across said opening, a delivery receptacle at the discharge end of the screen belt, a cleaner for the belt and a pipe leading from said box on the opposite side of the belt to a point adjacent to the plant to be operated upon, substantially as set forth.

In testimony that I claim the foregoing I have hereunto set my hand, at Milwaukee, in the county of Milwaukee, and in the State of Wisconsin, in the presence of two witnesses.

GEORGE W. YOUNG.

Witnesses:
N. E. OLIPHANT,
JOHN E. WILES.